United States Patent [19]

Moncur et al.

[11] Patent Number: 5,939,188
[45] Date of Patent: Aug. 17, 1999

[54] TRANSPARENT COATING SYSTEMS FOR IMPROVING THE ENVIRONMENTAL DURABILITY OF TRANSPARENCY SUBSTRATES

[75] Inventors: Marlowe Vern Moncur, Irvine; Clifford David Jeungst, Aliso Viejo, both of Calif.

[73] Assignee: Pilkington Aerospace, Inc., Garden Grove, Calif.

[21] Appl. No.: 08/968,892

[22] Filed: Nov. 6, 1997

Related U.S. Application Data

[63] Continuation of application No. 08/394,061, Feb. 24, 1995, abandoned, which is a continuation of application No. 08/054,349, Apr. 27, 1993, abandoned, which is a continuation of application No. 07/729,943, Jul. 15, 1991, abandoned.

[51] Int. Cl.⁶ ..................................................... B32B 27/40
[52] U.S. Cl. ........................ 428/332; 428/336; 428/423.3; 428/425.5; 428/425.6; 428/429; 428/432; 428/433; 428/434; 428/448
[58] Field of Search ..................................... 428/328, 331, 428/332, 336, 423.1, 423.3, 425.5, 425.6, 428, 429, 432, 433, 434, 448

[56] References Cited

U.S. PATENT DOCUMENTS

| | | | |
|---|---|---|---|
| 3,808,077 | 4/1974 | Rieser et al. | 156/102 |
| 4,010,311 | 3/1977 | Lewis et al. | 428/426 |
| 4,041,208 | 8/1977 | Seeger et al. | 428/424 |
| 4,045,269 | 8/1977 | Voss et al. | 156/221 |
| 4,079,160 | 3/1978 | Philipson | 428/217 |
| 4,174,240 | 11/1979 | Muller et al. | 156/99 |
| 4,232,080 | 11/1980 | Orain et al. | 428/215 |
| 4,277,299 | 7/1981 | Cherenko et al. | 156/242 |
| 4,364,731 | 12/1982 | Norling et al. | 428/428 |
| 4,373,057 | 2/1983 | Hammond | 524/700 |
| 4,435,450 | 3/1984 | Coleman | 427/385.5 |
| 4,468,420 | 8/1984 | Kawahara et al. | 427/397.7 |
| 4,584,229 | 4/1986 | Bourelier et al. | 428/216 |
| 4,625,012 | 11/1986 | Rizk et al. | 528/28 |
| 4,705,721 | 11/1987 | Frisch et al. | 428/349 |
| 4,731,289 | 3/1988 | Coleman | 428/334 |
| 4,741,961 | 5/1988 | Frisch et al. | 428/412 |
| 4,745,152 | 5/1988 | Fock et al. | 524/718 |
| 4,812,359 | 3/1989 | Hall | 428/332 |
| 4,824,926 | 4/1989 | O'Dwyer et al. | 528/65 |
| 4,891,271 | 1/1990 | Bravet et al. | 428/423.1 |
| 4,894,290 | 1/1990 | Chesworth et al. | 428/426 |
| 4,923,757 | 5/1990 | O'Dwyer et al. | 428/425.6 |
| 4,925,734 | 5/1990 | Agethen et al. | 428/349 |
| 4,937,147 | 6/1990 | Cartier et al. | 428/425.3 |
| 5,073,450 | 12/1991 | Nietering | 428/336 |

FOREIGN PATENT DOCUMENTS

| | | |
|---|---|---|
| 0117512 | 9/1984 | European Pat. Off. . |
| 0186407 | 7/1986 | European Pat. Off. . |
| 0186787 | 7/1986 | European Pat. Off. . |
| 0190517 | 8/1986 | European Pat. Off. . |
| 0229326 | 7/1987 | European Pat. Off. . |
| 0252207 | 1/1988 | European Pat. Off. . |
| 0275755 | 7/1988 | European Pat. Off. . |
| 1394271 | 5/1975 | United Kingdom . |
| 1453200 | 10/1976 | United Kingdom . |
| 1461817 | 1/1977 | United Kingdom . |
| 1518580 | 7/1978 | United Kingdom . |
| 2070045 | 9/1981 | United Kingdom . |
| 2116111 | 9/1983 | United Kingdom . |
| 2222984 | 3/1990 | United Kingdom . |

*Primary Examiner*—D. S. Nakarani
*Attorney, Agent, or Firm*—Sheppard, Mullin, Richter & Hampton LLP; James R. Brueggemann

[57] ABSTRACT

Transparent substrates having at least one surface coated with a transparent coating system to improve their environmental durability are described. The transparent coating system consists of a combination of components having different properties applied as separate layers to the transparent substrate. A thin layer of a silica-based adhesion promoter is applied directly to at least one surface of the substrate, followed by an organosilane primer layer, then a low modulus polyurethane layer, and, lastly, a thermoset aliphatic polyurethane layer. Alternatively, the low modulus polyurethane may also contain silanol groups or functional groups that can be hydrolyzed to silanol, thereby making a separate primer layer unnecessary.

60 Claims, No Drawings

TRANSPARENT COATING SYSTEMS FOR IMPROVING THE ENVIRONMENTAL DURABILITY OF TRANSPARENCY SUBSTRATES

This application is a continuation of application Ser. No. 08/394,061 filed Feb. 24, 1995, now abandoned, which is a continuation of application Ser. No. 08/054,349, filed Apr. 27, 1993, now abandoned, which is a continuation of application Ser. No. 07/729,943 filed Jul. 15, 1991, now abandoned.

BACKGROUND OF THE INVENTION

1. Field of the Invention

The present invention relates to transparent coating systems that are applied to transparent substrates, such as those used as windows in aircraft and military ground vehicles, to improve their environmental durability.

2. Description of Related Art

Aircraft and military ground vehicles are often required to operate under temperature extremes and other adverse environmental conditions. The external surfaces of their windows, whether made from glass or plastic, tend to become pitted due to the erosive effects of rain, hail, sand, dust, and the like. Such effects cause a reduction in visibility. Some vehicle windows also include transparent thin film coatings which have been applied to their external surfaces. They also are vulnerable to the same type of damage from these erosive effects, which leads to a loss of their functionality as well.

Tough, thermoset polyurethane coatings and films, sometimes referred to as "liners," exemplify one type of external transparent coating that has been used to protect glass and plastic surfaces from particle erosion and abrasion. While such polyurethanes are effective in reducing erosion damage, such coatings are not durable enough to withstand other adverse environmental conditions. For example, glass substrates covered with an erosion resistant polyurethane coating tend to fracture or spall when exposed to temperature extremes due to differences in the coefficient of thermal expansion between the polyurethane and the glass. Thermal expansion and contraction can also cause fracture or delamination of thin film coatings on glass or plastic substrates. Known polyurethane coatings also tend to be degraded by other environmental effects, such as UV exposure and the ingress of water, which results in loss of adhesion at one or more of the coating interfaces, ultimately leading to delamination.

Accordingly, the need exists for a transparent coating system that, when applied to a transparent substrate, will improve its environmental durability.

SUMMARY OF THE INVENTION

The present invention provides a transparent coating system for improving the environmental durability of a transparent substrate and a process for coating such substrates by applying layers of components having different properties to the transparent substrate. The combination of these components provides the particular advantages of the present invention. The first component is a silica-based adhesion promoter that is applied directly to at least one surface of the substrate. Next, an organosilane primer containing silanol groups or functional groups that can be hydrolyzed to silanol, and at least one additional reactive organic functional group, is applied directly to the silica-based adhesion promoter layer, such as by flow coating, and then cured. A low modulus polyurethane is applied over the organosilane primer, such as by flow coating, and, if necessary, cured or partially cured before the outermost layer, a protective thermoset aliphatic polyurethane, is applied and, if necessary, cured. Both the protective thermoset polyurethane and a low modulus polyurethane may be applied by flow coating or other well-known coating methods, or they may be applied by laminating a precast sheet to the underlying layer using a conventional vacuum bag/autoclave process. Alternately, instead of using a separate organosilane primer layer, the low modulus polyurethane may optionally contain silanol groups or functional groups that can be hydrolyzed to silanol, such as chlorosilyl, acetoxysilyl, and alkoxysilyl.

The silica-based adhesion promoter may be applied by a physical vapor deposition process, such as sputtering or evaporation, using a silicon, silicon monoxide, or silica source, or by a chemical vapor deposition process using other silicon-containing raw materials, such as tetrachlorosilane.

Suitable organosilane primers generally have the formula $(Y-R)_n Si(X)_m$, where m and n are integers from 1 to 3 and m+n=4; Y is a reactive organic functional group preferably selected from the group consisting of amino, hydroxy, carboxy, epoxy, isocyanato, and mercapto functional groups; R is an alkyl derivative; and X is hydroxy or a functional group that yields an hydroxy upon hydrolysis, such as alkoxy, acetoxy, or chloro. Amino-functional organosilanes are particularly preferred.

The fully-cured low modulus polyurethane has a tensile modulus at 100% elongation of less than about 500 psi, and a glass transition temperature (Tg) of −20° C. or less. The fully-cured protective thermoset aliphatic polyurethane has a tensile modulus at 100% elongation greater than about 500 psi but less than about 10,000 psi, preferably between about 1,000 psi and about 4,000 psi, and a tensile elongation of at least 100%, preferably at least 150%.

The transparent substrates are preferably selected from the group consisting of glass substrates, glass substrates having a transparent thin film coating, and plastic substrates having a transparent thin film coating.

Transparent substrates having the transparent coating systems of the present invention are especially useful as aircraft transparencies or as windows for military ground vehicles.

DETAILED DESCRIPTION OF THE INVENTION

The present invention comprises a transparent coating system for improving the environmental durability of transparent substrates and, in particular, those substrates to which a transparent thin film coating has been applied. The transparent protective coating system consists of a combination of components having different properties applied as separate layers to the transparent substrate, starting with a thin layer of a silica-based adhesion promoter applied directly to at least one surface of the substrate, followed by an organosilane primer layer, then a low modulus polyurethane layer, and, lastly, a thermoset aliphatic polyurethane layer. If preferred, the low modulus polyurethane may also contain silanol groups or functional groups that can be hydrolyzed to silanol, thereby making a separate primer layer unnecessary. The present invention also comprises a process for coating transparent substrates with a transparent protective coating system and the manufactured articles as described herein.

The transparent substrate may be made from any of the materials suitable for use as a window in airplanes or military ground vehicles. Such materials generally include glass and transparent plastics. Particularly useful plastic substrates include, but are not limited to, polycarbonates and acrylics, both stretched and cast. For purposes of the present invention, the outermost surface of the substrate preferably is a glass or a plastic material to which a transparent thin film coating has been applied. The transparent protective coating systems of the present invention may also be used advantageously on uncoated glass substrates. The substrate may be monolithic or a laminated combination of glass, plastic, and elastomeric components as known in the art.

The transparent thin film coating is usually applied by a vacuum deposition process, such as sputtering or evaporation. Suitable transparent thin film coatings may also be electrically conductive and include known dielectric or semiconductor metal oxide materials, used alone or in combination with a metal layer. Such metal oxides include indium tin oxide (referred to herein as "ITO"), titanium oxide ($TiO_2$), bismuth oxide ($Bi_2O_3$), and germanium oxide ($GeO_2$). Suitable metals that can be sandwiched between layers of such semiconductor oxides include gold and silver. The layers of the metal oxide material on both sides of the metal layer are usually substantially thicker than the metal layer therebetween. Suitable examples include an ITO/Au/ITO stack and a $TiO_2$/Au/$TiO_2$ stack in which the oxide layers are about 400 Å thick and the gold layer is about 100 Å thick. In electrically conductive films in which a semiconductor oxide layer is used alone, its thickness is usually greater, e.g., on the order of about 2,000 to 4,000 Å.

The first component of the transparent protective coating system is a silica-based adhesion promoter layer which also functions as a barrier, and is essential where the substrate has a conductive thin film coating. The silica-based adhesion promoter is applied directly to the surface of the substrate by either a physical vapor deposition or a chemical vapor deposition process. Physical vapor deposition processes include sputtering and electron beam or filament evaporation. Preferred source materials for such physical vapor deposition processes include silicon, silicon monoxide, and silica. The chemical vapor deposition process may employ other types of silicon-containing raw materials, such as tetrachlorosilane. The silica-based adhesion promoter may also include coatings which comprise a mixture of oxides containing other materials in addition to silica, such as a mixed silica/titania film. The thickness of the silica-based adhesion promoter layer may range from about 0.001 to about 0.5 microns (10 to 5000 Å), preferably from about 0.005 to about 0.1 micron (50 to 1000 Å).

The second component of the transparent protective coating systems of the present invention is an organosilane primer which provides a "bridge" between the silica layer and the low modulus polyurethane. The organosilane is formulated from components having both silanol functionality and at least one additional reactive organic functionality. By "silanol functionality" is meant silanol groups and groups that can be hydrolyzed to silanol, such as chlorosilyl, acetoxysilyl, and alkyloxysilyl. The additional reactive organic functionality is preferably selected from amino, hydroxy, carboxy, epoxy, isocyanato, and mercapto functional groups. The thickness of the organosilane primer layer ranges from about 0.1 to about 50 microns (1000 to 500,000 Å), and preferably from about 0.1 to about 5 microns (1000 to 50,000 Å).

Suitable organosilanes which may be used in the present invention, either alone or as components in formulated primers, are generally of the formula $(Y-R)_n Si(X)_m$ where m and n are integers from 1 to 3, and m+n=4; Y is a reactive organic functional group such as those identified above; R is an alkyl derivative, such as methylene or 1,3-propylene; and X is hydroxy or a group that yields hydroxy upon hydrolysis, such as alkoxy, acetoxy, or chloro.

Examples of preferred commercially available organosilanes which may be used as the primer in the present invention include the following, with the manufacturer identified in the parenthesis following the trade name:

| CHEMICAL NAME | TRADE NAME |
|---|---|
| 3-glycidoxypropyl trimethoxysilane | Z-6040 (Dow Corning) |
| | A-187 (Union Carbide) |
| 3-mercaptopropyl trimethoxysilane | Z-6062 (Dow Corning) |
| | A-189 (Union Carbide) |
| N-(2-aminoethyl)aminopropyl trimethoxysilane | Z-6020 (Dow Corning) |
| | A-1120 (Union Carbide) |
| 3-aminopropyl trimethoxysilane | A-1110 (Union Carbide) |
| 3-aminopropyl triethoxysilane | A-1100 (Union Carbide) |
| N'-(2-aminoethyl)-N-(2-aminoethyl)-3-aminopropyl trimethoxysilane | A-1130 (Union Carbide) |
| 2-(3,4-epoxycyclohexyl)ethyl trimethoxysilane | A-186 (Union Carbide) |

Preferred primers are those that are formulated with an amino-functional organosilane, such as Union Carbide's A-1100, A-1110, A-1120, A-1130, and Dow Corning's Z-6020.

Commercially available formulated primers containing organosilanes of the type described above include Dow Corning's Q1-6106 which contains Z-6040; Dow Corning's 1206 which contains a mixture of Z-6030 and Z-6062; and Lord Chemical's AP-133 which contains an aminosilane.

Preferred organosilane primers were formulated for purposes of the examples described below, and have been identified as "Primer 1," "Primer 2," etc. for convenience. As described in the examples, the primer layers were applied by flow coating and then cured in place by a combination of air drying and oven baking. These formulated primers are as follows:

| PRIMER 1 | Parts (wt) |
|---|---|
| AP-133[1] | 62.5 |
| Methanol | 15.0 |
| Denatured Alcohol | 15.0 |
| Toluene | 7.5 |
| Acetone | 3.12 |
| 1-Butanol | 21.87 |
| SRC-18[2] | 1.25 |

[1]AP-133 is an amino-functional silane from Lord Chemical.
[2]SRC-18 is a silicone catalyst from General Electric.

Procedure For Preparing Primer 1:

Mix the solvents in the order stated above. Suction filter the solvent mixture through a Whatman #1 filter paper. Add the SRC-18 with good mixing to the filtered solvent mixture, and then add the AP-133. Store refrigerated in a dry polypropylene bottle.

| PRIMER 2 | Parts (wt) |
|---|---|
| Carboset 526/Ammonia[3] | 40.0 |
| Water | 24.0 |
| Butyl Cellosolve | 35.0 |

-continued

| PRIMER 2 | Parts (wt) |
|---|---|
| Cymel 303[4] | 0.65 |
| Cycat 4040[5] | 0.15 |
| Z-6020[6] | 0.14 |
| MD W65-3150[7] | 1.0 |

[3]90 grams water, 1.0 gram concentrated NH$_4$OH, and 5 grams Carboset 526 which is a carboxyl-functional acrylic resin from B F Goodrich.
[4]Cymel 303 is a melamine resin from American Cyanamide.
[5]Cycat 4040 is p-toluene sulfonic acid in IPA from American Cyanamid.
[6]Z-6020 is N-(2-aminoethyl-3-aminopropyl) trimethoxysilane from Dow Corning.
[7]MD W65-3510 is an epoxy resin from HiTek.

Procedure For Mixing Primer 2:

Mix the ingredients in the order stated above, and store refrigerated in a dry polypropylene bottle.

| PRIMER 3 | Parts (wt) |
|---|---|
| 1-Butanol | 207.6 |
| Toluene | 70.8 |
| Denatured Alcohol | 142.8 |
| Methanol | 142.8 |
| Acetone | 30.0 |
| SRC-18 | 17.7 |
| A0564[8] | 300.0 |
| 09814[9] | 300.0 |

[8]A0564 is allyltriethoxysilane from Petrarch Systems.
[9]09814 is 1,1,3,3,5,5,7,7-octamethyltetrasiloxane from Petrach Systems.

Procedure For Preparing Primer 3:

Mix the solvents in the order stated above. Suction filter the solvent mixture through a Whatman #1 filter paper. To the filtered solvent mixture, add with good mixing the SRC-18. Add the remaining silanes in the order above with good mixing. Store refrigerated in dry polypropylene bottles. At 40° F., (4° C.) the shelf-life is over 3 months.

| PRIMER 4 | Parts (wt) |
|---|---|
| Cellosolve | 31.43 |
| Cellosolve Acetate | 42.43 |
| Butyl Cellosolve | 15.72 |
| Epon 828[10] | 2.86 |
| Carboset 526 | 7.07 |
| Cycat 4040 | 0.48 |

[10]Epon 828 is a bisphenol A glycidal ether epoxy from Shell.

Procedure For Preparing Primer 4:

Mix the components in the order stated above, and store refrigerated in a dry polypropylene bottle.

| PRIMER 5 | Parts (wt) |
|---|---|
| Part A: | |
| Z-6020 | 1.0 |
| Water | 4.0 |
| Cellosolve | 95.0 |
| Primer prep: | |
| Part A | 2.5 |
| Water | 3.9 |
| Cellosolve | 93.6 |

Procedure For Preparing Primer 5:

Mix the components of Part A together in a polyethylene or polypropylene container. Mix well for 20 minutes. This solution has a one week shelf-life.

For the primer preparation, mix components together in a polyethylene or polypropylene container. Primer shelf life is one day.

The third component of the transparent protective coating system of the present invention is a transparent low modulus elastomeric polyurethane which may contain aliphatic or aromatic components, or both, and may be either thermoplastic or thermoset. The fully-cured bulk polyurethane material must have a tensile modulus at 100% elongation of less than about 500 psi at room temperature and a glass transition temperature (Tg) of about −20° C. or less. The thickness of the low modulus polyurethane layer is preferably between about 5 to about 250 microns (0.0002 to 0.010 inch).

The low modulus polyurethane is made by known methods from a mixture of (1) one or more aliphatic, cycloaliphatic, or aromatic diisocyanates; (2) at least one polymeric polyol consisting of polyether or polyester polyols, or both; and, optionally, (3) at least one short chain polyol. The identified polyols may be linear, i.e., having an hydroxyl functionality of 2, or branched, i.e., having an hydroxyl functionality of greater than 2, or mixtures of these two types.

Preferred diisocyanates include the following: 1,6-hexamethylene diisocyanate; 2,2,4-trimethyl-1,6-hexane diisocyanate; bis(4-isocyanatocyclohexyl)methane including isomeric mixtures; bis(3-methyl-4-isocyanatocyclohexyl)methane; 2,2-bis(4-isocyanatocyclohexyl)propane; 3-isocyanatomethyl-3,5,5-trimethylcyclohexylisocyanate; trans-cyclohexane-1,4-diisocyanate; 1,3-(diisocyanatomethyl)cyclohexane; 2,4-toluene diisocyanate; 2,6-toluene diisocyanate; and bis(4-isocyanatophenyl)methane. Of these diisocyanates, those particularly preferred include the bis(4-isocyanatocyclohexyl)methane including isomeric mixtures which is sold as Desmodur W by Mobay Corporation, and bis(4-isocyanatophenyl)methane.

Preferred polymeric polyols include linear and branched chain polymers with hydroxyl functionality of two or three based on polyethylene oxide, polypropylene oxide, polytetramethylene oxide, polycaprolactone, and polyesters made from aliphatic diacids, such as adipic, succinic, palmitic, azeleic, sebacic, etc., and low molecular weight diols, such as ethylene glycol, 1,3-propanediol, 1,4-butanediol, 1,6-hexanediol, 1,4-cyclohexanedimethylol, and 2,2-dimethylpropane-1,3-diol, etc. Of these polymeric polyols, those particularly preferred are polyether diols and triols, especially those based on polytramethylene oxide having a molecular weight above about 1,000.

Where a short chain polyol is included, those preferred include ethylene glycol; 1,3-propanediol; 1,4-butanediol; 1,5-pentanediol; 1,6-hexanediol; 1,12-decanediol; 2,2-dimethylpropane-1,3-diol; 1,4-cyclohexanedimethylol; and 1,2,3-trimethylolpropane. A particularly preferred short chain polyol is 1,4-butanediol.

As an alternative embodiment of the present invention, the low modulus polyurethane may optionally contain silanol groups or functional groups that can be hydrolyzed to silanol. In such embodiments, a separate primer layer is unnecessary.

Low modulus thermoset polyurethanes may be applied by any of the well-known coating methods, and then partially cured or cured as necessary. Since low modulus thermoplastic polyurethanes are already cured in solution, the solution may be applied by any of such methods and the solvent is then evaporated. Low modulus thermoplastic polyurethanes may also be applied by laminating a precast or extruded sheet to the underlying layer using a conventional vacuum bag/autoclave process.

For purposes of the examples set forth below, a low modulus aromatic polyether thermoset urethane (referred to as "PUR-A") having the properties identified in Table II below was prepared based on a branched, isocyanate-functional, moisture-curable prepolymer made from methylene diphenyl diisocyanate and polytetramethylene oxide polyols which include at least one polyol with hydroxyl functionality greater than two, and having an equivalent weight of approximately 3,900. As described in the examples, the PUR-A layer was applied by flow coating and then partially cured by air drying before the protective thermoset polyurethane was applied.

The fourth component of the transparent protective coating systems of the present invention is a protective thermoset polyurethane which makes up the outermost layer of the coating system. The transparent protective polyurethane layer is a cross-linked (thermoset) material based on aliphatic or cycloaliphatic isocyanate-functional components. While its tensile modulus at 100% elongation may vary over a wide range, it must be higher than the tensile modulus of the underlying low-modulus polyurethane. Preferably, the tensile modulus at 100% elongation of the fully-cured protective thermoset polyurethane is greater than about 500 psi but less than about 10,000 psi, most preferably between about 1,000 psi and about 4,000 psi. The fully-cured protective polyurethane also has a tensile elongation of at least 100%, and preferably at least 150%. The protective polyurethane layer optionally may contain additives to improve its stability or to alter some of its properties, such as UV absorbers, anti-oxidants, and anti-static agents. The preferred thickness of the protective thermoset polyurethane layer is between about 25 to about 1,250 microns (0.001 to 0.050 inch).

The protective thermoset polyurethane layer must be transparent, and comprises an elastomeric, cross-linked polyurethane made by known methods from (1) at least one aliphatic or cycloaliphatic diisocyanate; (2) at least one polymeric polyol consisting of polyether or polyester polyols, or both; and, optionally, (3) at least one short chain polyol. At least one polyol having an hydroxyl functionality of greater than 2 must be included.

Preferred diisocyanates include the following: 1,6-hexamethylene diisocyanate; 2,2,4-trimethyl-1,6-hexane diisocyanate; bis(4-isocyanatocyclohexyl)methane including isomeric mixtures; bis(3-methyl-4-isocyanatocyclohexyl)methane; 2,2-bis(4-isocyanatocyclohexyl)propane; 3-isocyanatomethyl-3,5,5-trimethylcyclohexylisocyanate; trans-cyclohexane-1,4-diisocyanate; and 1,3-(diisocyanatomethyl)cyclohexane. Of these diisocyanates, bis(4-isocyanatocyclohexyl)methane including the isomeric mixture sold as Desmodur W by Mobay Corporation is particularly preferred.

The preferred polymeric polyols include linear and branched chain polymers having hydroxyl functionality of 2 or 3 which are based on polyethylene oxide; polypropylene oxide; polytetramethylene oxide; polycaprolactone; and polyesters made from aliphatic diacids, such as adipic, succinic, palmitic, azeleic, sebacic, etc., and low molecular weight diols, such as ethylene glycol, 1,3-propanediol, 1,4-butanediol, 1,6-hexanediol, 1,4-cyclohexanedimethylol, and 2,2-dimethylol propane-1,3-diol, etc. Particularly preferred polymeric polyols are the polycaprolactone diols and triols, including mixtures thereof, having molecular weights from about 300 to about 2,000.

Preferred short chain polyols include ethylene glycol; 1,3-propanediol; 1,4-butanediol; 1,5-pentanediol; 1,6-hexanediol; 1,12-decanediol; 2,2-dimethylpropane-1,3-diol; 1,4-cyclohexanedimethylol; and 1,2,3-trimethylolpropane. A particularly preferred short chain polyol is 1,4-butanediol.

For purposes of the examples set forth below, preferred protective thermoset polyurethanes were prepared having the formulations set forth in Table I. For convenience, these protective polyurethanes are referred to as "PUR-B" and "PUR-C." Both PUR-B and PUR-C are aliphatic polyester thermoset urethanes. As described in the examples, the PUR-B and PUR-C layers were both applied by flow coating, and PUR-B was also applied by laminating precast sheets of PUR-B to the partially cured PUR-A layer using a conventional vacuum bag/autoclave process.

TABLE I

| Raw Material | Description | Equiv. Wt. | Pur-B WT % | Pur-C WT % |
|---|---|---|---|---|
| Desmodur W[1] | Bis(4-isocyanato-cyclohexyl)methane | 131.1 | 38.62 | 45.85 |
| Tone-301[2] | Polyester Triol | 101.3 | — | 23.56 |
| Tone-305[2] | Polyester Triol | 181.8 | 43.88 | — |
| BDO | Butanediol | 45 | 0.36 | — |
| Tone-200[2] | Polyester Diol | 262.9 | — | 30.59 |
| Tone-210[2] | Polyester Diol | 417.9 | 17.2 | — |
| Tinuvin 328[3] | UV Stabilizer | — | 0.5 | 0.5 |
| Irganox 1076[3] | Antioxidant | — | 0.5 | 0.5 |

[1]Available from Mobay Corporation
[2]Available from Union Carbide Corporation
[3]Available from Ciba Geigy Corporation For comparison purposes, the following properties of PUR-A, the low modulus polyurethane described above which is used in the following examples, were compared to those of the protective polyurethanes PUR-B and PUR-C:

TABLE II

| | PUR-A (LOW MODULUS POLYURETHANE) | PUR-B (PROTECTIVE POLYURETHANE) | PUR-C (PROTECTIVE POLYURETHANE) |
|---|---|---|---|
| Tensile Strength, psi (ASTM D-638) | 7145 ± 1962 | 4980 ± 620 | 5843 ± 1672 |
| Elongation, % (ASTM D-638) | 700 ± 33 | 163 ± 22 | 177 ± 50 |
| Modulus at 100%, psi (ASTM D-638) | 220 ± 69 | 2041 ± 720 | 3160 ± 1306 |
| Tear Strength, pit (ASTM D-624) | 222 ± 64 | 479 ± 176 | 897 ± 334 |
| Shore "D" Hardness | — | 49 ± 9 | 67 |
| $T_g$, °C. | −67 | 14 | 33 |

As Table II shows, the tensile modulus at 100% elongation of the protective thermoset polyurethanes PUR-B and PUR-C greatly exceeds that of the low modulus polyurethane PUR-A. In addition, the glass transition temperature of PUR-A is −67° C., which is significantly below that of the protective polyurethanes.

Each of the different components of the protective coating systems described above are essential for obtaining the advantages of the present invention. As the following examples demonstrate, each component plays an important function and must be present for the protective coating system to provide improved environmental durability. The silica-based adhesion layer must be present to avoid failures at the primer/substrate interface caused by exposure to such environmental conditions as humidity, water, heat, ultraviolet radiation, and the like. Since polyurethanes are not generally compatible with silica, the primer layer functions to act as a bridge between them to obtain good adhesion. The low modulus polyurethane is important for minimizing glass spalling and coating delamination due to high shear stress caused by temperature extremes. Finally, the protective thermoset polyurethane, which is the layer actually exposed to the environment, provides good solvent resistance, weathering, and erosion resistance.

Before the protective coating systems of the present invention are applied, the transparent substrates are preferably cleaned using techniques known in the art. The primer layer and the polyurethane layers can be applied by common coating methods, such as flow coating, dip coating, roller coating, spraying, brushing, spin coating, cascading, and the like. Dip coating and other coating techniques that coat both sides of a substrate may be used if desired, or single side coating techniques may be repeated on another side of a substrate when more than one surface is to be coated. A sheet of the protective polyurethane can also be laminated to a thermoplastic layer or a partially cured thermoset layer of the low modulus polyurethane as indicated above and described in the following examples.

In order to more fully and clearly describe the present invention so that those skilled in the art may better understand how to practice the present invention, the following examples are given. These examples are intended to illustrate the invention and should not be construed as limiting the invention disclosed and claimed herein in any manner.

DESCRIPTION OF TEST PROCEDURES

The following test procedures were used in testing each of the samples described below:

1. Humidity Testing

Those substrates having a sheet of PUR-B laminated thereto were tested by quantifying the initial peel strength using a 90° peel test according to ASTM D-3167 with peel strength measured in pounds/inch width (PIW). The samples were then exposed to 140° F. (60° C.) and 100% relative humidity. After the indicated exposure time, the peel strength was again measured using the 90° peel test after the sample was allowed to equilibrate to room temperature, generally after about 15 minutes.

Those substrates having a layer of PUR-B applied thereto by flow coating were tested by measuring the initial % adhesion using a cross-hatch peel test with 3M #250 tape according to ASTM D3359. The samples were then exposed to 105° F. (40.5° C.) and 100% relative humidity. After the indicated exposure time, % adhesion was again measured using the cross-hatch peel test.

2. Cold Testing

The samples having a glass substrate were subjected to a cold soak at −81° F. (−63° C.) for 1 hour. The samples were observed after exposure to determine whether any delamination or glass spalling had occurred.

3. Heat Aging

The samples having a plastic substrate were exposed to 180° F. (82° C.) dry heat. The samples were periodically inspected to determine the % adhesion using the cross-hatch peel test described above.

EXAMPLES

Example 1

Soda lime glass (0.187 inch thick) with a transparent, electrically conductive indium tin oxide (ITO) coating (sold under the name Hyviz by Triplex Aircraft and Special Products, Ltd.) was used to prepare the test samples for adhesion, humidity aging and thermal shock tests. A layer of silica, about 150 Å thick, was applied to the ITO surface by vacuum deposition, using a reactive magnetron sputtering process from a silicon source. Primer 2 was then applied by flow coating, and the primer was cured by air drying at room temperature for 0.5 hour, and then oven baking for 2 hours at 200° F. (93° C.). A 24% by weight solution of low modulus polyurethane A ("PUR-A") (with 70% cyclohexanone and 6% toluene) was applied to the ITO surface by flow coating and allowed to air dry for 3–4 hours. This gave a partially-cured PUR-A layer about 0.001 inch thick. Sheets of protective polyurethane B ("PUR-B", 0.015–0.020 inch thick) were prepared by casting from a solventless raw material mix containing 200 ppm dibutyl tin dilaurate catalyst and curing at 100–140° F. (38–60° C.) for 2 hours followed by 180° F. (82° C.) for 24 hours. A PUR-B sheet was laminated to the PUR-A surface using a conventional vacuum bag/autoclave process in which lay up assemblies with a glass cover plate over the PUR-B surface were vacuum bagged and laminated using 180 psi pressure and 215° F. (102° C.) for 4 hours.

Example 2

The samples were prepared as in Example 1 except that the ITO surface was treated with Primer 5 before application of the PUR-A layer. Primer 5 was applied by flow coating, and cured by air drying at room temperature for 0.5 hour, and then oven baking for 0.5 hour at 180° F. (82° C.).

Example 3

The samples were prepared as in Example 1 except that the silica layer was deposited by an electron beam evaporation process instead of by sputtering, and the substrate was subjected to glow discharge prior to the silica deposition. The glow discharge treatment consisted of exposing the substrate surface to an oxygen plasma at $3\times10^{-2}$ torr for 30 minutes. The thickness of the silica layer was about 150 Å.

Example 4

The samples were prepared as in Example 2 except that the silica layer was deposited by electron beam evaporation process as described in Example 3 instead of by sputtering. The thickness of the silica layer was about 150 Å.

Example 5

The samples were prepared as in Example 1 except that the silica layer was deposited by a filament evaporation process instead of by sputtering, and the substrate was treated by glow discharge prior to deposition as described in Example 3. The thickness of the silica layer was about 150 Å.

Example 6

The samples were prepared as in Example 2 except that the silica layer was deposited by filament evaporation as described in Example 5 instead of by sputtering. The thickness of the silica layer was about 150 Å.

Example 7
(Comparative—silica layer omitted)

The samples were prepared using ITO-coated glass as described in Example 1, except that the silica layer was omitted. Primer 1 was applied directly to the ITO surface by flow coating, and then cured by air drying at room temperature for 0.5 hour and then oven baking for 1 hour at 200° F. (93° C.). The samples were completed by adding PUR-A and PUR-B layers as described in Example 1.

Example 8
(Comparative—silica layer omitted)

The samples were prepared as in Example 7 except that Primer 2 was used instead of Primer 1. Application and cure of the Primer 2 layer were as described in Example 1.

Example 9
(Comparative—silica layer omitted)

The samples were prepared as in Example 7 except that Primer 3 was used instead of Primer 1. Primer 3 was applied directly to the ITO surface by flow coating, and then cured by air drying at room temperature for 0.5 hour and then oven baking for 1 hour at 200° F. (93° C.).

Example 10
(Comparative—silica layer omitted)

The samples were prepared as in Example 7 except that Primer 4 was used instead of Primer 1. Primer 4 was applied directly to the ITO surface by flow coating, and then cured by air drying at room temperature for 0.5 hour and then oven baking for 1 hour at 200° F. (93° C.).

Example 11
(Comparative—primer omitted)

ITO-coated glass as described in Example 1 was used. A layer of silica, about 150 Å thick, was applied to the ITO surface by vacuum deposition, using a reactive magnetron sputtering process from a silicon source. The samples were completed by adding PUR-A and PUR-B layers as described in Example 1. No primer was used.

Example 12
(Comparative—low modulus polyurethane omitted)

The samples were prepared as in Example 6 except that the PUR-A layer was omitted. The PUR-B sheet was laminated directly to the Primer 5 layer.

Example 13
(Comparative—both silica and primer layers omitted)

The samples were prepared as in Example 1 except that both the silica layer and the primer layer were omitted. The PUR-A layer was applied directly to the ITO surface before the PUR-B sheet was laminated thereto.

Example 14
(Comparative—both silica and low modulus polyurethane layers omitted)

The samples were prepared as in Example 2 except that both the silica layer and the PUR-A layer were omitted. The PUR-B sheet was laminated directly to the Primer 5 layer.

Example 15

The samples were prepared using uncoated soda lime glass (0.187 inch thick) instead of the ITO coated glass used in the previous examples. The soda lime glass was coated with a sputtered silica layer, deposited as described in Example 11. Primer 5 was then applied over the silica layer as described in Example 2, followed by the PUR-A layer and the PUR-B layer as described in Example 1.

Example 16
(Comparative—silica layer omitted)

The samples were prepared as described in Example 15, except that the silica layer was omitted before the Primer 5 layer was applied.

Example 17
(Comparative—low modulus polyurethane omitted)

The samples were prepared as described in Example 15, except that the PUR-A layer was omitted. The PUR-B sheet was laminated directly to the Primer 5 layer.

Example 18
(Comparative—both silica and primer layers omitted)

The samples were prepared as described in Example 15, except that both the silica layer and the primer layer were omitted. The PUR-A layer was applied directly to the uncoated soda lime glass.

Example 19

A polycarbonate sheet, 0.250 inch thick (Tuffak W available from Rohm and Haas), was coated with an acrylic primer made from SHP-200 (General Electric) diluted to 50% of its original concentration with a 50/50 mixture of cellosolve/diacetone alcohol. Silvue 100 polysiloxane coating (SDC Coatings, Inc.) was then applied over this primer. Each coating was applied by a flow process and cured by air drying for 0.5 hour in a Class 100 clean room and oven curing for 2 hours at 200° F. (93° C.). A 3-layer thin film gold coating was then applied to the primed polycarbonate sheet by a magnetron sputtering vacuum deposition process. The film consisted of an ITO/Au/ITO stack in which each of the ITO layers were about 400 Å thick and the gold layer was about 100 Å thick.

A silica-based adhesion promoter layer was then deposited by means of a filament evaporation process as described in Example 5. The thickness of the silica layer was about 150 Å. The Primer 5 layer and the PUR-A layer were applied over the silica layer and cured as described in Examples 1 and 2. Instead of using the PUR-B sheet, a solution of PUR-C was prepared from a solventless raw material mix containing 30 ppm dibutyl tin dialaurate catalyst, and then a layer of PUR-C was applied over the PUR-A layer by a flow coating process. The PUR-C layer was cured in place by standing at room temperature for 16 hours, followed by heating at 180° F. (82° C.) for 72 hours. The thickness of the PUR-C layer was about 0.003–0.005 inch.

Samples were cut from the coated sheet to run the described adhesion, humidity exposure, and heat aging tests.

Example 20

The samples were prepared as in Example 19 except that the sheet material was Acrivue 350S stretched acrylic (available from Swedlow, Inc.) instead of polycarbonate, and the initial SHP-200-based primer coating was omitted. The Silvue 100 polysiloxane coating was applied directly to the acrylic sheet.

Example 21

The samples were prepared as in Example 20 except that the silica layer was deposited by sputtering, as described in Example 1, instead of by filament evaporation.

Example 22

The samples were prepared as in Example 19 except that the 3-layer thin film coating was replaced with a single-layer, transparent, conductive ITO film. The ITO coating was about 4000 Å thick and was deposited by a magnetron sputtering process.

Example 23

The samples were prepared as in Example 22 except that the PUR-C layer was replaced by a sheet of PUR-B which was 0.007–0.010 inch thick. The PUR-B layer was initially cast as a free-standing sheet, and then laminated to the PUR-A layer as described in Example 1.

Example 24

The samples were prepared as in Example 19 except that the sheet material was Poly 84 as cast acrylic (available from Polycast) instead of polycarbonate, the initial SHP-200-based primer coating was omitted, and a layer of PUR-B was flow coated over the PUR-A layer in place of the PUR-C layer, and then cured as described in Example 19.

Example 25

The samples were prepared as in Example 19 except that a layer of PUR-B was flow coated over the PUR-A layer in place of the PUR-C layer, and then cured as described in Example 19.

Example 26

The samples were prepared as in Example 19 except that the PUR-C layer was replaced by a sheet of PUR-B as described in Example 23.

Example 27

The samples were prepared as in Example 6 except that the PUR-B sheet layer was replaced by flow coating a 0.003–0.005 inch thick layer of PUR-B applied and cured in the same manner as described in Example 19 for PUR-C.

Example 28

The samples were prepared as in Example 25 except that the ITO/Au/ITO film was replaced with a $TiO_2/Au/TiO_2$ film applied by a RF sputtering vacuum deposition process. The $TiO_2$ layers were about 400 Å thick and the gold layer was about 100 Å thick.

Example 29
(Comparative—silica layer omitted)

The samples were prepared as in Examples 20 and 21 except that the silica layer was omitted. The Primer 5 layer was applied directly to the ITO/Au/ITO surface.

Example 30
(Comparative—silica layer omitted)

The samples were prepared as in Example 19 except that the silica layer was omitted. The Primer 5 layer was applied directly to the ITO/Au/ITO surface.

Example 31
(Comparative—primer omitted)

The samples were prepared as in Example 20 except that the Primer 5 layer was omitted, and the PUR-C layer was replaced by flow coating and then curing a layer of PUR-B as described in Example 24. The PUR-A layer was applied directly to the silica layer.

Example 32
(Comparative—low modulus polyurethane omitted)

The samples were prepared as in Example 20 except that the PUR-A layer was omitted, and the PUR-C layer was replaced by a layer of PUR-B which was flow coated over the Primer 5 layer and then cured as described in Example 24.

As shown by the results of the testing set forth in Table III and Table IV below, each of the components of the protective coating systems of the present invention is necessary to obtain improved environmental durability. In particular, those examples of the present invention retained good adhesion after the described humidity test, generally losing less than 30% of their initial adhesion on the average. Significantly, those comparative examples that omitted the silica-based adhesion promoter layer had comparatively very poor adhesion after the humidity test. A similar lack of adhesion after the humidity test is shown by those comparative examples lacking a primer layer. Also of note is that in every instance where the low modulus polyurethane was omitted on a glass substrate, some spalling occurred as a result of the cold test, and those comparative examples also had poor adhesion.

TABLE III

| EXAMPLE | SUBSTRATE | CONDUCTIVE COATING | SiO$_2$ | PRIMER | LOW MODULUS PU | PROTECTIVE PU | AVERAGE PROTECTIVE PU THICKNESS (MILS) | COLD TEST | INITIAL ADHESION (PIW) | AVERAGE ADHESION AFTER HUMIDITY (PIW) | NUMBER REPLICATES |
|---|---|---|---|---|---|---|---|---|---|---|---|
| 1 | GLASS | ITO | SPUTTERED | 2 | PUR-A | PUR-B | 15–20 | NO SPALLING | 21.1 | 14.7 (4 weeks) | 5 |
| 2 | GLASS | ITO | SPUTTERED | 5 | PUR-A | PUR-B | 15–20 | NO SPALLING | 19.0 | 16.1 (4 weeks) | 9 |
| 3 | GLASS | ITO | E-BEAM | 2 | PUR-A | PUR-B | 15–20 | NO SPALLING | 20.8 | 18.4 (2 weeks) | 5 |
| 4 | GLASS | ITO | E-BEAM | 5 | PUR-A | PUR-B | 15–20 | NO SPALLING | 25.6 | 19.9 (4 weeks) | 3 |
| 5 | GLASS | ITO | FIL EVAP | 2 | PUR-A | PUR-B | 15–20 | NO SPALLING | 21.0 | 18.1 (2 weeks) | 5 |
| 6 | GLASS | ITO | FIL EVAP | 5 | PUR-A | PUR-B | 15–20 | NO SPALLING | 22.1 | 15.8 (4 weeks) | 26 |
| 7 | GLASS | ITO | NONE | 1 | PUR-A | PUR-B | 15–20 | NO SPALLING | 18.0 | 4.3 (4 weeks) | 5 |
| 8 | GLASS | ITO | NONE | 2 | PUR-A | PUR-B | 15–20 | NO SPALLING | 17.7 | 1.4 (4 weeks) | 20 |
| 9 | GLASS | ITO | NONE | 3 | PUR-A | PUR-B | 15–20 | NO SPALLING | 8.4 | 0.02 | 4 |
| 10 | GLASS | ITO | NONE | 4 | PUR-A | PUR-B | 15–20 | NO SPALLING | 5.4 | 0.7 (12 days) | 2 |
| 11 | GLASS | ITO | SPUTTERED | NONE | PUR-A | PUR-B | 15–20 | NO SPALLING | 4.4 | 0.1 (6 Hrs.) | 2 |
| 12 | GLASS | ITO | FIL EVAP | 5 | NONE | PUR-B | 15–20 | 5% SPALLING POOR ADHESION | 4.7 | Delam (4 weeks) | 3 |
| 13 | GLASS | ITO | NONE | NONE | PUR-A | PUR-B | 15–20 | NO SPALLING | 9.1 | 1.0 (1 week) | 5 |
| 14 | GLASS | ITO | NONE | 5 | NONE | PUR-B | 15–20 | 40% SPALLING DELAM | 4.2 | Delam (24 Hrs.) | 1 |
| 15 | GLASS | NONE | SPUTTERED | 5 | PUR-A | PUR-B | 15–20 | NO SPALLING | 12.4 | 13.9 (4 weeks) | 3 |
| 16 | GLASS | NONE | NONE | 5 | PUR-A | PUR-B | 15–20 | NO DELAM | 9.9 | 9.8 (4 weeks) | 3 |
| 17 | GLASS | NONE | SPUTTERED | 5 | NONE | PUR-B | 15–20 | NO SPALLING NO DELAM | 6.1 | 1.8 (4 weeks) | 3 |
| 18 | GLASS | NONE | NONE | NONE | PUR-A | PUR-B | 15–20 | 70% SPALLING DELAM NO SPALLING | 7.7 | 0.15 (1 week) | 1 |

TABLE IV

| EXAMPLE | SUBSTRATE | CONDUCTIVE COATING | SiO$_2$ | PRIMER | LOW MODULUS PU | PROTECTIVE PU | PROTECTIVE PU THICKNESS (MILS) | INITIAL ADHESION (%) | ADHESION AFTER HUMIDITY (%) | POST HEAT AGEING ADHESION (%) |
|---|---|---|---|---|---|---|---|---|---|---|
| 19 | PC | ITO/Au/ITO | FIL EVAP | 5 | PUR-A | PUR-C | 3–5 | 100% | 100% AFTER 2000 HRS. | — |
| 20 | 350S | ITO/Au/ITO | FIL EVAP | 5 | PUR-A | PUR-C | 3–5 | 100% | 100% AFTER 2000 HRS. | — |
| 21 | 350S | ITO/Au/ITO | SPUTTERED | 5 | PUR-A | PUR-C | 3–5 | 100% | 100% AFTER 1000 HRS. | 100% AFTER 750 HRS. |
| 22 | PC | ITO | FIL EVAP | 5 | PUR-A | PUR-C | 3–5 | 100% | 100% AFTER 1000 HRS. | — |
| 23 | PC | ITO | FIL EVAP | 5 | PUR-A | PUR-B | 7–10 | 100% | 100% AFTER 750 HRS. | — |
| 24 | POLY 84 | ITO/Au/ITO | FIL EVAP | 5 | PUR-A | PUR-B | 3–5 | 100% | 100% AFTER 1000 HRS. | — |
| 25 | PC | ITO/Au/ITO | FIL EVAP | 5 | PUR-A | PUR-B | 3–5 | 100% | 100% AFTER 1000 HRS. | — |
| 26 | PC | ITO/Au/ITO | FIL EVAP | 5 | PUR-A | PUR-B | 7–10 | 100% | 100% AFTER 1000 HRS. | — |
| 27 | GLASS | ITO | FIL EVAP | 5 | PUR-A | PUR-B | 3–5 | 100% | 100% AFTER 750 HRS. | — |
| 28 | PC | TiO$_2$/Au/TiO$_2$ | FIL EVAP | 5 | PUR-A | PUR-B | 3–5 | 100% | 100% AFTER 1000 HRS. | — |
| 29 | 350S | ITO/Au/ITO | NONE | 5 | PUR-A | PUR-C | 3–5 | 0–100% | 0% < 1000 HRS. | 0% < 200 HRS. |
| 30 | PC | ITO/Au/ITO | NONE | 5 | PUR-A | PUR-C | 3–5 | 0–100% | — | — |
| 31 | 350S | ITO/Au/ITO | FIL EVAP | NONE | PUR-A | PUR-B | 3–5 | 65–90% | 0% < 250 HRS. | — |
| 32 | 350S | ITO/Au/ITO | FIL EVAP | 5 | NONE | PUR-B | 3–5 | 0% | — | — |

Other modifications and variations of the present invention are possible in light of the above teachings. For example, additives and other modifying agents may be added to one or more of the layers of the protective coating systems of the present invention. It is to be understood, however, that changes may be made in the particular embodiments described above which are within the full intended scope of the invention as defined in the appended claims.

We claim:

1. A transparent substrate having at least one surface coated with a transparent coating system to improve its environmental durability when the coated surface is exposed to the environment, comprising:

a transparent glass or plastic substrate having a transparent thin film coating on at least one surface, wherein the thin film coating comprises one or more layers of a first dielectric or semiconductive metal oxide material; and a transparent coating system on the transparent thin film coating, wherein said transparent coating system comprises:

a silica-based adhesion promoter layer which is applied to the exposed surface of the thin film coating, wherein the silica-based adhesion promoter layer consists essentially of silica or a mixture of silica and a second metal oxide material, an organosilane primer layer which is applied over the silica-based adhesion promoter layer, wherein the organosilane includes silanol groups or functional groups that can be hydrolyzed to silanol, and at least one additional reactive organic fimctional group, a low modulus thermoset polyurethane layer which is applied over the organosilane primer layer, wherein the fully cured low modulus thermoset polyurethane has a tensile modulus at 100% elongation of less than about 500 psi at room temperature and a glass transition temperature of about −20° C. or less, and a protective thermoset aliphatic polyurethane layer which is applied over the low modulus thermoset polyurethane layer, wherein the fully-cured protective thermoset polyurethane has a tensile modulus at 100% elongation of more than about 500 psi but less than about 10,000 psi, and a tensile elongation of at least 100%.

2. The coated transparent substrate of claim 1 wherein the silica-based adhesion promoter layer is applied by physical vapor deposition or by chemical vapor deposition.

3. The coated transparent substrate of claim 2 wherein the silica-based adhesion promoter layer is applied by sputtering.

4. The coated transparent substrate of claim 2 wherein the silica-based adhesion promoter layer is applied by evaporation.

5. The coated transparent substrate of claim 2 wherein the thickness of the silica-based adhesion promoter layer is from about 0.001 to about 0.5 microns.

6. The coated transparent substrate of claim 1 wherein the functional groups in the organosilane that can be hydrolyzed to silanol include chlorosilyl, acetoxysilyl, and alkoxysilyl.

7. The coated transparent substrate of claim 1 wherein the additional reactive organic functional group in the organosilane is selected from the group consisting of amino, hydroxy, carboxy, epoxy, isocyanato, and mercapto functional groups.

8. The coated transparent substrate of claim 7 wherein the organosilane is an amino-functional organosilane.

9. The coated transparent substrate of claim 7 wherein the organosilane is selected from the group consisting of 3-glycidoxypropyl trimethoxysilane, 3-mercaptopropyl trimethoxysilane, N-(2-aminoethyl)aminopropyl trimethoxysilane, 3-aminopropyl trimethoxysilane, 3-aminopropyl triethoxysilane, N'-(2-aminoethyl)-N-(2-aminoethyl)-3-aminopropyl trimethoxysilane, and 2-(3,4-epoxycyclohexyl)ethyl trimethoxysilane.

10. The coated transparent substrate of claim 1 wherein the organosilane has the formula $(Y-R)_n Si(X)_m$, where m and n are integers from 1–3, and m+n=4; Y is a reactive functional group selected from the group consisting of amino, hydroxy, carboxy, epoxy, isocyanato, and mercapto functional groups; R is a linear or branched saturated aliphatic bivalent hydrocarbon radical; and X is hydroxy or a group that yields hydroxy upon hydrolysis.

11. The coated transparent substrate of claim 1 wherein the thickness of the organosilane primer layer is from about 0.1 to about 50 microns.

12. The coated transparent substrate of claim 1 wherein the low modulus thermoset polyurethane is prepared from a branched, isocyanate-functional, moisture-curable prepolymer made from methylene diphenyl diisocyanate and polytetramethylene oxide polyols which include at least one polyol with hydroxyl functionality greater than two and having an equivalent weight of about 3,900.

13. The coated transparent substrate of claim 1 wherein the low modulus thermoset polyurethane is prepared from bis(4-isocyanatocyclohexyl)methane including isomeric mixtures and polytetramethylene oxide diol having a molecular weight of at least 1,000.

14. The coated transparent substrate of claim 1 wherein the thickness of the low modulus thermoset polyurethane layer is from about 5 to about 250 microns.

15. The coated transparent substrate of claim 1 wherein the protective thermoset polyurethane has a tensile modulus at 100% elongation between about 1,000 psi and about 4,000 psi.

16. The coated transparent substrate of claim 1 wherein the protective thermoset polyurethane has a tensile elongation of at least 150%.

17. The coated transparent substrate of claim 1 wherein the protective thermoset polyurethane is an aliphatic polyester urethane.

18. The coated transparent substrate of claim 1 wherein the thickness of the protective thermoset polyurethane is from about 25 to about 1,250 microns.

19. The coated transparent substrate of claim 1 wherein the protective thermoset polyurethane contains at least one additive selected from the group consisting of UV absorbers, antioxidants, and antistatic agents.

20. The coated transparent substrate of claim 1, wherein the thin film coating further comprises a metal layer sandwiched between layers of the oxide material.

21. The coated transparent substrate of claim 20, wherein said metal is gold and said first oxide material is indium tin oxide.

22. The coated transparent substrate of claim 20, wherein said metal is silver and said first oxide material is indium tin oxide.

23. The coated transparent substrate of claim 20, wherein said metal is gold and said first oxide material is titanium oxide.

24. The coated transparent substrate of claim 20, wherein said metal is silver and said first oxide material is titanium oxide.

25. The coated transparent substrate of claim 20, wherein said metal layer comprises silver.

26. The coated transparent substrate of claim 25, wherein said oxide material is indium tin oxide.

27. The coated transparent substrate of claim 25, wherein said oxide material is titanium oxide.

28. The coated transparent substrate of claim 20, wherein said metal layer comprises gold.

29. The coated transparent substrate of claim 1, wherein said first oxide material is selected from the group consisting of indium tin oxide, titanium oxide, bismuth oxide, and germanium oxide.

30. The coated transparent substrate of claim 1, wherein said transparent, thin film coating is electrically conductive.

31. A transparent substrate having at least one surface coated with a transparent coating system to improve its environmental durability when the coated surface is exposed to the environment, comprising:
   a transparent glass or plastic substrate having a transparent thin film coating on at least one surface, wherein the thin film coating comprises one or more layers of a first dielectric or semiconductive metal oxide material;
   a transparent coating system on the transparent thin film coating, wherein said transparent coating system comprises
      a silica-based adhesion promoter layer which is applied to the exposed surface of the thin film coating, wherein the silica-based adhesion promoter layer consists essentially of silica or a mixture of silica and a second metal oxide material,
      a low modulus thermoset polyurethane layer which is applied over the silica-based adhesion promoter layer, wherein low modulus thermoset polyurethane includes silanol groups or functional groups that can be hydrolyzed to silanol, and the fully-cured low modulus thermoset polyurethane has a tensile modulus at 100% elongation of less than about 500 psi at room temperature, and a glass transition temperature of −20° C. or less, and
      a protective thermoset aliphatic polyurethane layer which is applied over the low modulus thermoset polyurethane layer, wherein the fully-cured protective thermoset polyurethane has a tensile modulus at 100% elongation of more than about 500 psi but less than about 10,000 psi, and a tensile elongation of at least 100%.

32. The coated transparent substrate of claim 31 wherein the silica-based adhesion promoter layer is applied by physical vapor deposition or by chemical vapor deposition.

33. The coated transparent substrate of claim 21 wherein the functional groups in the low modulus thermoset polyurethane that can be hydrolyzed to silanol include chlorosilyl, acetoxysilyl, and alkoxysilyl.

34. The coated transparent substrate of claim 31 wherein the protective thermoset polyurethane has a tensile modulus at 100% elongation between about 1,000 psi and about 4,000 psi.

35. The coated transparent substrate of claim 31 wherein the protective thermoset polyurethane has a tensile elongation of at least 150%.

36. The coated transparent substrate of claim 31 wherein the protective thermoset polyurethane is an aliphatic polyester urethane.

37. The coated transparent substrate of claim 31 wherein the protective thermoset polyurethane contains at least one additive selected from the group consisting of UV absorbers, antioxidants, and antistatic agents.

38. The coated transparent substrate of claim 31, wherein the thin film coating further comprises a metal layer sandwiched between layers of the first oxide material.

39. The coated transparent substrate of claim 38, wherein said metal is gold and said first oxide material is indium tin oxide.

40. The coated transparent substrate of claim 38, wherein said metal is silver and said first oxide material is indium tin oxide.

41. The coated transparent substrate of claim 38, wherein said metal is gold and said first oxide material is titanium oxide.

42. The coated transparent substrate of claim 38, wherein said metal is silver and said first oxide material is titanium oxide.

43. The coated transparent substrate of claim 38, wherein said metal layer comprises silver.

44. The coated transparent substrate of claim 43 wherein said first oxide material is indium tin oxide.

45. The coated transparent substrate of claim 43, wherein said first oxide material is titanium oxide.

46. The coated transparent substrate of claim 38, wherein said metal layer comprises gold.

47. The coated transparent substrate of claim 31, wherein said first oxide material is selected from the group consisting of indium tin oxide, titanium oxide, bismuth oxide, and germanium oxide.

48. The coated transparent substrate of claim 31, wherein said transparent, thin film coating is electrically conductive.

49. A transparent substrate having at least one surface coated with a transparent coating system to improve its environmental durability when the coated surface is exposed to the environment, comprising:
   a transparent glass or plastic substrate having a transparent thin film coating on at least one surface, wherein the thin film coating comprises one or more layers of a first dielectric or semiconductive metal oxide material; and
   a transparent coating system on the transparent thin film coating, wherein said transparent coating system comprises:
      a silica-based adhesion promoter layer which is applied to the surface of the thin film coating, wherein the silica-based adhesion promoter layer consists essentially of silica or a mixture of silica and a second metal oxide material,
      an organosilane primer layer which is applied over the silica-based adhesion promoter layer, wherein the organosilane includes silanol groups or functional groups that can be hydrolyzed to silanol, and at least one additional reactive organic functional group selected from the group consisting of amino, hydroxy, carboxy, epoxy, isocyanato, and mercapto functional groups,
      a low modulus thermoset polyurethane layer which is applied over the organosilane primer layer, wherein the fully cured low modulus thermoset polyurethane has a tensile modulus at 100% elongation of less than about 500 psi at room temperature, and a glass transition temperature of about −20° C. or less, and
      a protective thermoset aliphatic polyurethane which is applied over the low-modulus thermoset polyurethane layer, wherein the fully-cured protective thermoset polyurethane has a tensile modulus at 100% elongation of between about 1,000 psi and about 4,000 psi, a tensile elongation of at least 150%, and contains at least one additive selected from the group consisting of UV absorbers, antioxidants, and antistatic agents.

50. The coated transparent substrate of claim 49, wherein the thin film coating further comprises a metal layer sandwiched between layers of the first oxide material.

51. The coated transparent substrate of claim 50, wherein said metal is gold and said first oxide material is indium tin oxide.

52. The coated transparent substrate of claim 50, wherein said metal is silver and said first oxide material is indium tin oxide.

53. The coated transparent substrate of claim 50, wherein said metal is gold and said first oxide material is titanium oxide.

54. The coated transparent substrate of claim 50, wherein said metal is silver and said first oxide material is titanium oxide.

55. The coated transparent substrate of claim 50, wherein said metal layer comprises silver.

56. The coated transparent substrate of claim 55, wherein said first oxide material is indium tin oxide.

57. The coated transparent substrate of claim 55, wherein said first oxide material is titanium oxide.

58. The coated transparent substrate of claim 50, wherein said metal layer comprises gold.

59. The coated transparent substrate of claim 49, wherein said first oxide material is selected from the group consisting of indium tin oxide, titanium oxide, bismuth oxide, and germanium oxide.

60. The coated transparent substrate of claim 49, wherein said transparent, thin film coating is electrically conductive.

* * * * *